Aug. 20, 1940.  V. C. BUCHANAN  2,212,007

GLARE SHIELD

Filed Aug. 17, 1939

INVENTOR.
Verl. C. Buchanan
BY
Howry Hamilton
ATTORNEYS

Patented Aug. 20, 1940

2,212,007

UNITED STATES PATENT OFFICE 2,212,007

GLARE SHIELD

Verl C. Buchanan, Kansas City, Mo.

Application August 17, 1939, Serial No. 290,636

4 Claims. (Cl. 296—97)

This invention relates to glare shields for automobiles and has for its primary object the provision of a specially formed device that is attachable to the conventional visor forming a part of the automobile body.

A still further object of this invention is the provision of a glare shield that may be quickly and conveniently positioned on the conventional visor of an automobile, so that the means for operably carrying the shield may be disposed in a place where the parts thereof are confined between the visor and the ceiling of the automobile passenger compartment, which means is arranged to permit adjustment of the shield toward and from the eyes of the driver as it is raised or lowered through manipulation of the visor per se about its pivotal connection.

Another important aim of this invention is to provide novel means for supporting a colored, transparent shield in a position before the eyes of an automobile driver so that glare is eliminated and the shield may be selectively employed merely by slightly moving the head and without shifting the position of the body.

This invention has for another object, the provision of a glare shield wherein is incorporated a detachable, transparent member, carried by a T-shaped head in such a fashion as to permit replacement so that shields of a desired color may be made a part of the assembly to suit the individual automobile driver.

Other objects of the invention will appear during the course of the following specification, referring to the accompanying drawing wherein.

Figure 1:
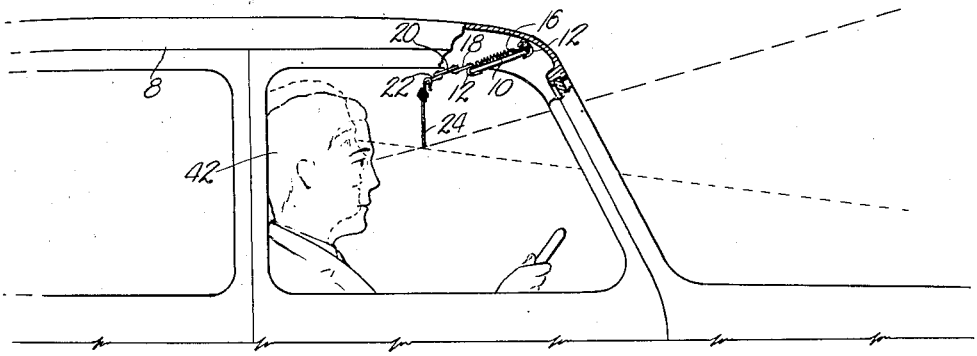
Figure 1 is a fragmentary elevational view of a glare shield made to embody the present invention and illustrating the same in an operative position.
Figure 2:
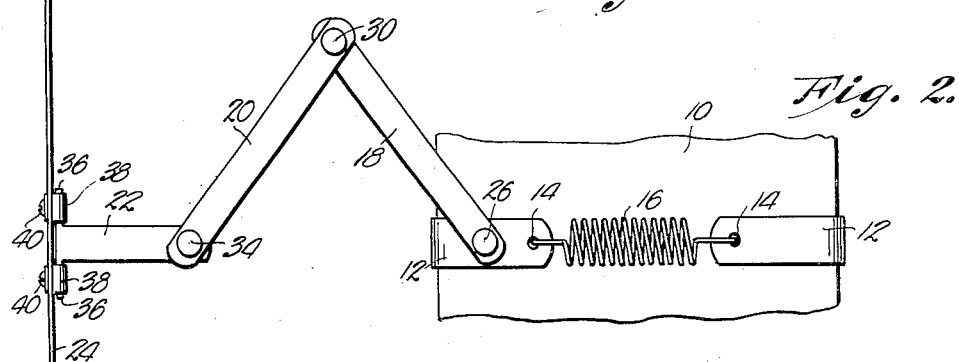
Fig. 2 is a top plan view of the glare shield showing the same attached to the visor of an automobile.

The conventional form of automobile body 8 is usually equipped with a visor 10, which is adjustably mounted for movement to and from an inclined position, such as that illustrated in Fig. 1. The visors of the various makes of automobiles are of different widths, and therefore, means has been provided to attach the glare shield to any of the visors now found in commercial vehicles.

A pair of U-shaped clips 12 are disposed in opposed relation so as to draw the bights thereof against the opposite edges of visor 10. The inner or proximal ends of clips 12 are provided with openings 14 which receive the ends of a coil spring or similar resilient member 16, which yieldably draws the U-shaped clips 12 against the edges of visor 10.

One of clips 12 supports a series of links 18 and 20, the T-shaped head 22, and a specially formed shield 24. Link 18 is pivotally secured to clip 12 through the medium of a rivet 26 and a spring washer 28 should be interposed between link 18 and clip 12.

Figure 3:
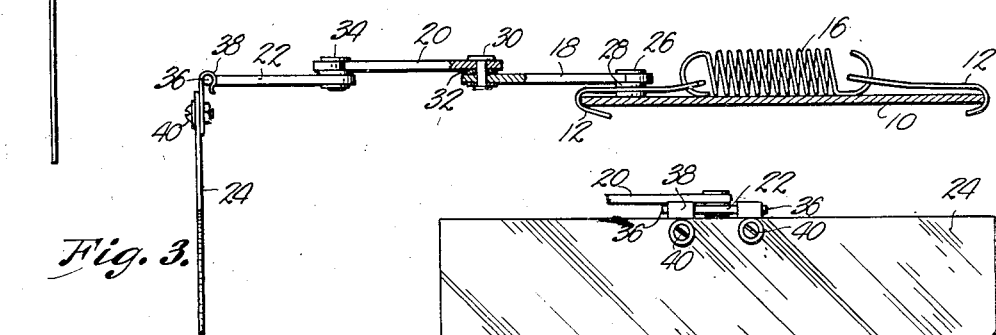
Fig. 3 is an edge elevational view of the glare shield assembly.
Figure 4:
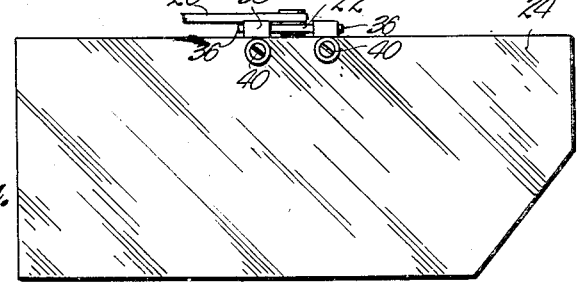
Fig. 4 is an end view of the glare shield.

Link 20 is joined to the other end of link 18 by a similar rivet 30, and a spring washer 32 is employed at this zone of juncture between links 18 and 20, as shown in detail in Fig. 3. The outer end of link 20 is in turn joined to the T-shaped head 22 through the use of a rivet 34, thus, the desired relation between links 18 and 20 respectively and head 22 may be maintained because of the friction established at rivets 30 and 34. A similar relation is set up at rivet 26 so that when the operator extends the linkage to a desired point, it will not be maladjusted by vibration or accidental forces.

Head 22 has the base of its stem secured to link 20, as before described, while cross arms 36 extend to either side of the stem to be engaged by resilient fixtures 38 mounted directly on shield 24 by bolts or other suitable means 40.

Cross arms 36 are cylindrical and receive the rebent portions of fixtures 38 in a manner shown in Fig. 3. Two fixtures are used and when positioned as illustrated, they will preclude accidental movement longitudinally along cross arms 36 but permit movement of shield 24 about the axis thereof. Thus, the shield may be inclined from a vertical plane to any desired degree and the friction between fixtures 38 and cross arms 36 will maintain the shield in a set position.

One edge of shield 24 is inclined inwardly and downwardly when the shield is in a vertical position so that the operator of the vehicle may cut off the direct rays of light when his head and eyes are in a position to view the road in front of the automobile. This form of shield 24, together with the ability to position the same in a place immediately before the eyes, insures a clear vision as the rays from an approaching car, for example, are intercepted by shield 24.

Figures 5, 6:
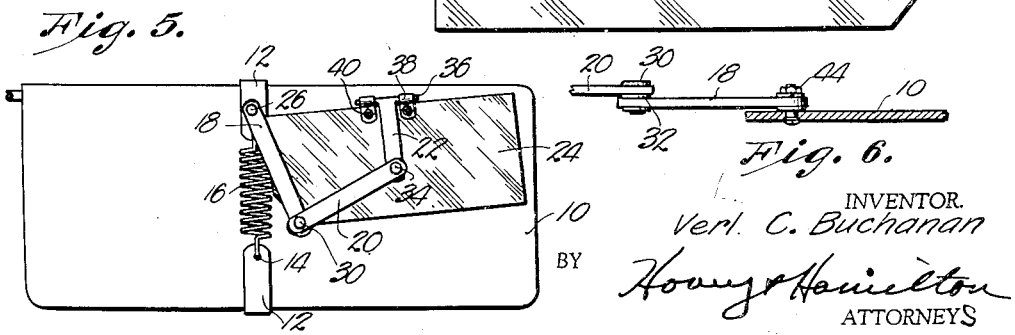
Fig. 5 is a top plan view of the glare shield illustrating the same in an inoperative position within the confines of the edges of the automobile visor; and, Fig. 6 is a fragmentary detailed sectional view illustrating the means for attaching the links of the glare shield to the automobile visor in accordance with a modified form of the invention.

Not only does the means for mounting shield 24 upon visor 10 afford an effective way of adjusting the parts and disposing them in a position as shown in Fig. 5, but presents an assembly that will not cause injury in event of sudden stops, which might throw the head of the driver in a forward direction.

With a glare shield made in accordance with the foregoing specification, it is possible to dispose the same where the head 42 of the driver may be slightly moved from the position shown in full lines to the position shown in dotted lines, in order to fully protect the eyes against the rays of light from the headlights of an approaching vehicle. The parts described permit the glare shield to be placed where effort will not be expended in periodically using the same.

In some instances it will be desired to affix the glare shield to visor 10 by securing the inner end of link 18 directly to the visor through the medium of a bolt or the like 44. In this form of the assembly, attachment is semi-permanent and requires the use of tools, whereas the clips previously described, may be associated with visor 10 without special equipment of any type.

It is understood that glare shields having physical appearances different from those illustrated and described might be made without departing from the spirit of the invention or scope of the appended claims.

Having thus described the invention, what is claimed as new and desired to be secured by Letters Patent is:

1. In a device of the character described for automobiles having an adjustable visor, a transparent shield; means for mounting the shield on the visor; and a resilient fixture between the shield and mounting means for releasably holding the shield in place, said mounting means having a plurality of pivotally interconnected links disposed in the same plane as the visor, and a head pivotally joined to one of said links, said resilient fixture being in engagement with said head.

2. In a device of the character described for automobiles having an adjustable visor, a transparent shield; means for mounting the shield on the visor; and a resilient fixture between the shield and mounting means for releasably holding the shield in place, said mounting means having a plurality of pivotally interconnected links disposed in the same plane as the visor, and a head pivotally joined to one of said links, said resilient fixture being in engagement with said head, said shield having a downwardly and inwardly inclined edge when the shield is in a vertical plane.

3. In a device of the character described for automobiles having an adjustable visor, a transparent shield; means for mounting the shield on the visor; and a resilient fixture between the shield and mounting means for releasably holding the shield in place, said mounting means having a plurality of pivotally interconnected links disposed in the same plane as the visor, and a head pivotally joined to one of said links, said resilient fixture being in engagement with said head, said head being T-shaped to present a pair of oppositely extending elements, there being a portion of said resilient fixture in engagement with said element.

4. In a device of the character described for automobiles having an adjustable visor, a transparent shield; and means for mounting the shield on the visor comprising a pair of U-shaped clips engaging opposite sides of the visor, a spring joining the clips to draw the same toward each other and against the visor edges, a plurality of pivotally interconnected links one of which has one of its ends pivotally joined to one of said U-shaped clips, a T-shaped head pivotally joined to another of said links, and resilient fixtures on the shield for yieldably and pivotally engaging the T-shaped head, said links and head being in a plane parallel to and slightly to one side of the major plane of the visor, whereby the links, said head and the shield may be moved to a position beside the visor and within the confines of the edges thereof.

VERL C. BUCHANAN.